US010716131B2

(12) United States Patent
Feng

(10) Patent No.: US 10,716,131 B2
(45) Date of Patent: Jul. 14, 2020

(54) DATA TRANSMISSION METHOD AND TERMINAL

(71) Applicant: GUANGDONG OPPO MOBILE TELECOMMUNICATIONS CORP., LTD., Dongguan, Guangdong (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 32 days.

(21) Appl. No.: 15/771,319

(22) PCT Filed: Jan. 25, 2016

(86) PCT No.: PCT/CN2016/071960
§ 371 (c)(1),
(2) Date: Apr. 26, 2018

(87) PCT Pub. No.: WO2017/127974
PCT Pub. Date: Aug. 3, 2017

(65) Prior Publication Data
US 2018/0324839 A1    Nov. 8, 2018

(51) Int. Cl.
*H04W 72/12*    (2009.01)
*H04L 5/00*    (2006.01)
(Continued)

(52) U.S. Cl.
CPC ........ *H04W 72/1289* (2013.01); *H04L 5/0053* (2013.01); *H04W 72/02* (2013.01);
(Continued)

(58) Field of Classification Search
CPC .. H04L 5/0053; H04W 72/02; H04W 72/042; H04W 72/1205; H04W 72/1284; H04W 72/1289; H04W 72/1278
(Continued)

(56) References Cited

U.S. PATENT DOCUMENTS 8,503,380 B2   8/2013  Meyer
9,374,820 B2   6/2016  Schliwa-Bertling
(Continued)

FOREIGN PATENT DOCUMENTS

CN    101742427 A    6/2010
CN    102469567 A    5/2012
(Continued)

OTHER PUBLICATIONS

Alcatel-Lucent Shanghai Bell et al: "Overview of Specification Impact for TTI Shortening", 3GPP Draft; R1-156721 Overview of Specification Impact for TTI Shortening Final, 3rd Generation Partnership Project (3GPP), Mobile Competence Centre ; 650, Route Des Lucioles ; F-06921 Sophia-Anti Poli vol. RAN WGI, No, Anaheim, US; Nov. 15, 2014-Nov. 22, 2014 Nov. 15, 2015 (Nov. 15, 2015), XP051003102,Retrievea from the Internet:URL:hftp://www.3app.org/ftp/Meetings_3GPP_SYNC/RAN1/Docs/ [retrieved on Nov. 15, 2015].

(Continued)

*Primary Examiner* — Rownak Islam
(74) *Attorney, Agent, or Firm* — Ladas & Parry, LLP

(57) ABSTRACT

The present invention discloses a data transmission method and a terminal. In the method, the terminal supports transmissions with different TTL The method comprises: a base station instructing the terminal to use, on the basis of a target time unit of a target carrier wave, a first TTI for transmitting first data for semi-persistent scheduling and a second TTI for transmitting a second data for dynamic scheduling; and determining, on the basis of respective positions in the target time unit of a first time resource occupied for transmitting semi-persistent scheduling and of a second time resource occupied for transmitting dynamic scheduling, to transmit at least one of the first data and the second data, thereby (Continued)

achieving dynamic scheduling and semi-persistent scheduling using different TTIs.

20 Claims, 5 Drawing Sheets

(51) Int. Cl.
*H04W 72/02* (2009.01)
*H04W 72/04* (2009.01)

(52) U.S. Cl.
CPC ..... *H04W 72/042* (2013.01); *H04W 72/1205* (2013.01); *H04W 72/1284* (2013.01); *H04W 72/1278* (2013.01)

(58) Field of Classification Search
USPC .......................................................... 370/336
See application file for complete search history.

(56) References Cited

U.S. PATENT DOCUMENTS

| | | | |
|---|---|---|---|
| 10,225,849 B2* | 3/2019 | Wang | H04W 72/0446 |
| 2010/0081443 A1 | 4/2010 | Meyer | |
| 2011/0051643 A1* | 3/2011 | Hans | H04L 5/0087 370/311 |
| 2011/0164489 A1 | 7/2011 | Papasakellariou | |
| 2011/0243261 A1* | 10/2011 | Bienas | H04W 72/1215 375/260 |
| 2011/0317645 A1* | 12/2011 | Jen | H04L 5/001 370/329 |
| 2012/0155416 A1 | 6/2012 | Zhang | |
| 2012/0327877 A1* | 12/2012 | Zhao | H04W 72/1252 370/329 |
| 2013/0315179 A1 | 11/2013 | Meyer et al. | |
| 2014/0161108 A1* | 6/2014 | Lohr | H04L 5/0007 370/336 |
| 2015/0078306 A1 | 3/2015 | Meyer et al. | |
| 2015/0173071 A1 | 6/2015 | Schliwa-Bertling | |
| 2015/0188650 A1 | 7/2015 | Au et al. | |
| 2016/0021645 A1 | 1/2016 | He | |
| 2017/0105228 A1 | 4/2017 | Meyer et al. | |
| 2018/0160438 A1 | 6/2018 | Meyer et al. | |
| 2018/0242389 A1* | 8/2018 | Phuyal | H04W 72/042 |

FOREIGN PATENT DOCUMENTS

| | | |
|---|---|---|
| CN | 102595611 A | 7/2012 |
| CN | 102665183 A | 9/2012 |
| CN | 103004269 A | 3/2013 |
| CN | 104022856 A | 9/2014 |
| CN | 104186006 A | 12/2014 |
| CN | 104378185 A | 2/2015 |
| CN | 105246164 A | 1/2016 |
| JP | 2014209772 A | 11/2014 |
| WO | 2013077785 A1 | 5/2013 |

OTHER PUBLICATIONS

"3rd Generation Partnership Project; Technical Specification Group Radio Access Network; Evolved Universa Terrestrial Radio Access (E-UTRA); Study on latency reduction techniques for LTE (Release13)", 3GPP Standard; Technical Report; 3GPP TR 36.881, 3rd Generation Partnership Project (3GPP) Mobile Competence Centre ; 650, Route Des Lucioles ; F-06921 Sophia-Antipolis Cedex ; France, vol. RAN WG2, No. V0.5,0, Dec. 4, 2015 (Dec. 4, 2015), XP051450164, [retrieved on Dec. 4, 2015].

Supplementary European Search Report in the European application No. 16886861.0, dated Mar. 28, 2019.

English translation of the Written Opinion of the International Search Authority in the international application No. PCT/CN2016/071960, dated Oct. 12, 2016.

International Search Report in international application No. PCT/CN2016/071960, dated Oct. 12, 2016.

Written Opinion of the International Search Authority in international application No. PCT/CN2016/071960, dated Oct. 12, 2016.

Intel Corporation, Further aspects of fast uplink access solutions[ on line], 3GPP TSG-RAN WG2#91bis R2-154386, R2-154386, the Internet<URL:http://www.3gpp.org/ftp/tsg ran/WG2 RL2/TSGR2 91 bis/Docs/R2-154386.zip>, Sep. 26, 2015.

First Office Action of the Japanese application No. 2018-517561, dated Nov. 12, 2019.

First Office Action of the Chinese application No. 201680055461.6, dated Apr. 21, 2020.

* cited by examiner

100

| A terminal receives first indication signaling sent by a base station, the first indication signaling indicating the terminal to communicate first SPS data at a first TTI on a target time cell of a target carrier | S110 |

| The terminal receives second indication signaling sent by the base station, the second indication signaling indicating the terminal to communicate second DS data at a second TTI on the target time cell of the target carrier, where a length of the first TTI is unequal to a length of the second TTI, and is smaller than or equal to a length of the time cell, and the length of the second TTI is smaller than or equal to the length of the time cell | S120 |

| The terminal determines a location of a first time resource occupied by SPS transmission in the target time cell and a location of a second time resource occupied by DS transmission in the target time cell | S130 |

| The terminal determines to communicate at least one of the first data or the second data according to the location of the first time resource in the target time cell and the location of the second time resource in the target time cell | S140 |

FIG. 1

DATA TRANSMISSION METHOD AND TERMINAL

RELATED APPLICATION

This application is an application under 35 U.S.C. 371 of International Application No. PCT/CN2016/071960 filed on Jan. 25, 2016, the entire contents of which are incorporated herein by reference.

TECHNICAL FIELD

Embodiments of the disclosure relate to the field of communications, and more particularly to a data communication method and terminal.

BACKGROUND

Along with development of an air interface technology and continuous extension of applications thereof, reducing a transmission delay becomes one of key communication indexes in a future communication technology. For example, an end-to-end transmission delay of real-time remote computing for mobile terminals is required to be shorter than 10 ms, a transmission delay of traffic efficiency and safety is required to be shorter than 5 ms, and another service may require a shorter transmission delay.

One of key technologies for reducing a transmission delay is shortening a Transmission Time Interval (TTI). At present, the length of a TTI of the Long Term Evolution (LTE) system is 1 ms, and LTE-Advanced Release 13 (LTE-A Rel-13) has determined to start making researches on data transmission with a shorter TTI.

A short TTI has the advantage of shortening of the transmission delay, however, at the corresponding cost of high control signaling overhead and low spectrum efficiency. For a terminal with multiple types of services running concurrently, if a unified TTI is determined according to the service with a minimum delay requirement, resources may be wasted. For ensuring the transmission delay and simultaneously considering system efficiency, the terminal may be dynamically scheduled to use different TTI lengths, that is, a short TTI is used for transmission of a short-delay service, and a conventional TTI is used when another service is transmitted. Therefore, LTE-A Rel-13 makes such a requirement that compatibility with the existing LTE system should be ensured on a carrier supporting short-TTI transmission, that is, compatibility with a 1 ms TTI is required.

At present, an LTE system supports two different data scheduling manners, i.e., semi-persistent scheduling (SPS) and dynamic scheduling (DS), where SPS means that a base station indicates terminals scheduling information through high-layer signaling, including: a scheduling period, a physical resource location and a modulation and scheduling level, and after the base station sends Downlink Control Information (DCI) to the terminal to trigger the terminal for SPS, the terminal performs data communication on the same frequency resource at a fixed interval. DS means that whenever the base station determines to perform a burst of data communication, the base station sends a piece of DCI to the terminal, and the terminal performs data communication on a corresponding time-frequency resource according to an indication of the DCI, where DS has no fixed period.

In a system not supporting a short TTI, DS and SPS correspond to the same TTI. When time-frequency resources corresponding to DS and SPS are overlapped, since DS and SPS correspond to the same TTI, data incoming time, base station scheduling time, data processing time and the like corresponding to DS and SPS are all the same, a terminal may merge original SPS data and DS data together for communication. For example, the terminal merges all of the data for communication on the time-frequency resource corresponding to DS. That is, in an SPS transmission subframe, if the terminal receives DS, the DS data is received or sent (the base station packs the SPS data into the DS data).

However, when DS and SPS of the LTE system correspond to different TTIs, different data incoming time, base station scheduling time and data processing time corresponding to the scheduling make an existing working mechanism with SPS overridden by DS not applicable anymore.

SUMMARY

The embodiments of the disclosure provide a data transmission method and terminal, which may implement DS and SPS at different TTIs.

A first aspect provides a data transmission method, which may include that: a terminal receives first indication signaling sent by a base station, the first indication signaling indicating the terminal to communicate first SPS data at a first TTI on a target time unit of a target carrier; the terminal receives second indication signaling sent by the base station, the second indication signaling indicating the terminal to communicate second DS data at a second TTI on the target time unit of the target carrier, wherein a length of the first TTI may be unequal to a length of the second TTI, the length of the first TTI may be smaller than or equal to a length of the time unit, and the length of the second TTI may be smaller than or equal to the length of the time unit; the terminal determines a location of a first time resource occupied by SPS transmission in the target time unit and a location of a second time resource occupied by DS transmission in the target time unit; and the terminal determines to communicate at least one of the first data or the second data according to the location of the first time resource in the target time unit and the location of the second time resource in the target time unit.

Wherein, communication of the first SPS data may include sending of a first SPS scheduling Physical Uplink Shared Channel (PUSCH), and communication of the second DS data may include sending of a second DS PUSCH; or communication of the first SPS data may include reception of a first SPS Physical Downlink Shared Channel (PDSCH), and communication of the second DS data may include reception of a second DS PDSCH.

In the disclosure, the target time unit may include time resources occupied to communicate Physical Downlink Control Channels (PDCCHs) and time resources occupied to communicate data, and both the first time resource and the second time resource belong to time resources occupied to communicate data.

In the disclosure, Alternatively, the time unit is a frame, a subframe, a timeslot or a symbol. Alternatively, the time unit is a subframe.

In combination with the first aspect, in a first possible implementation mode of the first aspect, the operation that the terminal determines to communicate at least one of the first data or the second data according to the location of the first time resource in the target time unit and the location of the second time resource in the target time unit may include that: when the first time resource and the second time resource are overlapped in the target time unit, the terminal determines only to occupy the first time resource to communicate the first data.

In combination with the first aspect, in a second possible implementation mode of the first aspect, the operation that the terminal determines to communicate at least one of the first data or the second data according to the location of the first time resource in the target time unit and the location of the second time resource in the target time unit may include that: when the first time resource and the second time resource are overlapped in the target time unit and a starting time location of the first time resource is the same as a starting time location of the second time resource or the starting time location of the first time resource is after the starting time location of the second time resource, the terminal determines only to occupy the second time resource to communicate the second data.

In combination with the first aspect or the second possible implementation mode of the first aspect, in a third possible implementation mode of the first aspect, the operation that the terminal determines to communicate at least one of the first data or the second data according to the location of the first time resource in the target time unit and the location of the second time resource in the target time unit may include that: when the first time resource and the second time resource are overlapped in the target time unit and the starting time location of the second time resource is after the starting time location of the first time resource, the terminal determines only to occupy the first time resource to communicate the first data.

In combination with the first aspect or the second possible implementation mode of the first aspect or the third possible implementation mode of the first aspect, in a fourth possible implementation mode of the first aspect, the operation that the terminal determines to communicate at least one of the first data or the second data according to the location of the first time resource in the target time unit and the location of the second time resource in the target time unit may include that: when the first time resource and the second time resource are not overlapped in the target time unit, the terminal determines to occupy the first time resource to communicate the first data and occupy the second time resource to communicate the second data.

Specifically, the length of the first TTI is 1 ms, and the length of the second TTI is smaller than 1 ms; or, the length of the first TTI is smaller than 1 ms, and the length of the second TTI is smaller than 1 ms.

A second aspect provides a terminal, which may include a receiving module and a processing module and may be configured to execute the first aspect and the corresponding implementations thereof.

A third aspect provides a terminal, which may include a processor, a transceiver and a memory and may be configured to execute the first aspect and the corresponding implementations thereof, and, each device of the terminal of the third aspect may correspond to the corresponding module of the terminal of the second aspect.

According to the data communication method and terminal of the embodiments of the disclosure, the terminal supports communication with different TTIs, the base station indicates the terminal to communicate the first SPS data at the first TTI and communicate the second DS data at the second TTI on the target time unit of the target carrier, and at least one of the first data or the second data is determined to be communicated according to the respective locations of the first time resource occupied for SPS transmission and the second time resource occupied for DS transmission in the target time unit, so that DS and SPS under different TTIs are implemented.

BRIEF DESCRIPTION OF DRAWINGS

In order to describe the technical solutions of the embodiments of the disclosure more clearly, the drawings required to be used in the embodiments or a conventional art will be simply introduced below. Obviously, the drawings described below are only some embodiments of the disclosure. Other drawings may further be obtained by those skilled in the art according to these drawings without creative work.

FIG. 1 illustrates a schematic flowchart of a data communication method according to an embodiment of the disclosure.

DETAILED DESCRIPTION

Figure 2:
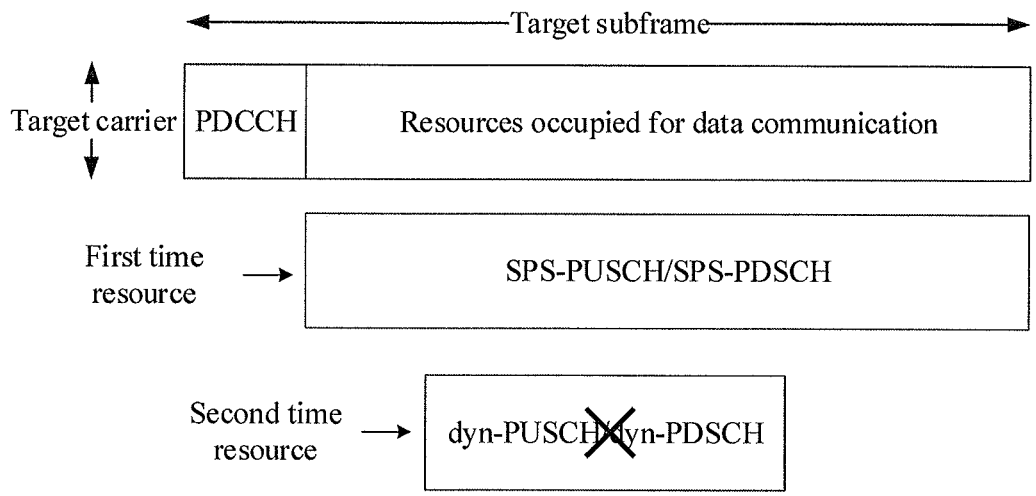
FIG. 2 illustrates a schematic diagram of data communication according to an embodiment of the disclosure.

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work shall fall within the scope of protection of the disclosure.

Terms "part", "module", "system" and the like used in the specification are adopted to represent an entity, hardware, firmware, combination of hardware and software, software or software in execution related to a computer. For example, a part may be, but not limited to, a process running on a processor, the processor, an object, an executable file, an execution thread, a program and/or a computer. It is graphically represented that all applications running on computing equipment and the computing equipment may be parts. One or more parts may reside in a process and/or an execution thread, and the parts may be located on a computer and/or distributed between two or more computers. In addition, these parts may be executed from various computer-readable media on which various data structures are stored. The parts may communicate through local and/or remote processes according to, for example, signals with one or more data groups (for example, data from two parts interacting with each other in a local system, a distributed system and/or a network, for example, the Internet interacting with another system through a signal).

It is to be understood that the technical solutions of the embodiments of the disclosure may be applied to various communication systems, for example: a Global System of Mobile Communication (GSM), a Code Division Multiple Access (CDMA) system, a Wideband CDMA (WCDMA) General Packet Radio Service (GPRS) system, an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a future 5th-Generation (5G) communication system.

Various embodiments are described in the disclosure in combination with a terminal. The terminal may communicate with one or more core networks through a Radio Access Network (RAN), and the terminal may refer to User Equipment (UE), an access terminal, a user unit, a subscriber station, a mobile radio station, a mobile station, a remote station, a remote terminal, mobile equipment, a user terminal, a terminal, wireless communication equipment, a user agent or a user device. The access terminal may be a cellular telephone, a cordless telephone, a Session Initiation Protocol (SIP) telephone, a Wireless Local Loop (WLL) station, a Personal Digital Assistant (PDA), handheld equipment with a wireless communication function, computing equipment, or other processing equipment connected to a wireless modem, vehicle-mounted equipment, wearable equipment, a terminal in a future 5G network and the like.

Various embodiments are described in the disclosure in combination with a base station. The base station may be equipment configured to communicate with the terminal, and for example, may be a Base Transceiver Station (BTS) in a GSM or CDMA, may also be a NodeB (NB) in a WCDMA system, and may further be an Evolutional Node B (eNB or eNodeB) in an LTE system. Or, the base station may be a relay station, an access point, vehicle-mounted equipment, wearable equipment, network-side equipment in the future 5G network and the like.

Related technologies and concepts involved in the embodiments of the disclosure will be briefly introduced below.

Along with development of an air interface technology and continuous extension of applications thereof, reducing a transmission delay becomes one of key communication indexes in future communication technologies. For example, an end-to-end transmission delay of real-time remote computing for mobile terminals is required to be shorter than 10 ms, a transmission delay of traffic efficiency and safety is required to be shorter than 5 ms, and another service may require a shorter transmission delay. Typical transmission delays for Downlink (DL) transmission in Release 8 (Rel 8) and Release 9 (Rel 9) of an LTE system are listed in Table 1.

TABLE 1

| Sequence number | Descriptions | Duration (ms) |
| --- | --- | --- |
| 1 | Processes incoming data | 3 |
| 2 | TTI alignment | 0.5 |
| 3 | Transmission of DL data | 1 |
| 4 | Data decoding in UE | 3 |
| | Total delay | 7.5 |

Delays generated by processes incoming data and data decoding in UE are mainly related to a length of a TTI. Therefore, one of key technologies for reducing the transmission delay is shortening the TTI. At present, in the LTE system, the length of a TTI is 1 ms, and LTE-A Rel-13 has determined to start making researches on data transmission with a shorter TTI.

A short FIT has the advantage of shortening of the transmission delay, however, at the corresponding cost of high control signaling overhead and low spectrum efficiency. For a terminal with multiple types of services running concurrently, if a unified TTI is determined according to the service with a minimum delay requirement, resources may be wasted. For ensuring the transmission delay and simultaneously considering system efficiency, the terminal may be dynamically scheduled to use different TTI lengths, that is, a short TTI is used for transmission of a short-delay service, and a conventional TTI is used when another service is transmitted. Therefore, LTE-A Rel-13 makes such a requirement that compatibility with the existing LTE system should be ensured on a carrier supporting short-TTI transmission, that is, compatibility with a 1 ms TTI is required.

At present, an LTE system supports two different data scheduling manners, i.e., Semi-Persistent Scheduling (SPS) and dynamic scheduling (DS), where SPS means that a base station indicates terminals scheduling information through high-layer signaling, including: a scheduling period, a physical resource location and a modulation and scheduling level, and after the base station sends Downlink Control Information (DCI) to the terminal to trigger the terminal for SPS, the terminal performs data communication on the same frequency resource at a fixed interval. DS means that whenever the base station determines to perform a burst of data communication, the base station sends a piece of DCI to the terminal, and the terminal performs data communication on a corresponding time-frequency resource according to an indication of the DCI, where DS has no fixed period.

In a system not supporting a short TTI, DS and SPS correspond to the same TTI. When time-frequency resources corresponding to DS and SPS are overlapped, since DS and SPS correspond to the same TTI, data incoming time, base station scheduling time, data processing time and the like corresponding to DS and SPS are all the same, a terminal may merge original SPS data and DS data together for communication. For example, the terminal merges all of the data for communication on the time-frequency resource corresponding to DS. That is, in an SPS transmission subframe, if the terminal receives DS, the DS data is received or sent (the base station packs the SPS data into the DS data).

However, when DS and SPS of the LTE system correspond to different TTIs, different data incoming time, base station scheduling time and data processing time corresponding to the scheduling make an existing working mechanism with SPS overridden by DS not applicable anymore.

On the basis of the problem, the embodiments of the disclosure provide a mechanism to implement data communication in the LTE system when DS and SPS correspond to different TTIs.

In the embodiments of the disclosure, a time unit may be a frame, a subframe, a timeslot or a symbol.

Preferably, the time unit may be a subframe. For convenience, descriptions will be made by taking a subframe as an example in the disclosure, and a target time unit is called as a target subframe.

FIG. 1 illustrates a data communication method 100 according to an embodiment of the disclosure. The method 100 includes the following operations.

In S110, a terminal receives first indication signaling sent by a base station. The first indication signaling indicates the terminal to communicate first SPS data at a first TTI on a target time unit of a target carrier.

In S120, the terminal receives second indication signaling sent by the base station. The second indication signaling indicates the terminal to communicate second DS data at a second TTI on the target time unit of the target carrier. Here, a length of the first TTI is unequal to a length of the second TTI, moreover, the length of the first TTI is smaller than or equal to a length of the time unit, and the length of the second TTI is smaller than or equal to the length of the time unit.

In S130, the terminal determines a location of a first time resource occupied by SPS transmission in the target time unit and a location of a second time resource occupied by DS transmission in the target time unit.

In S140, the terminal determines to communicate at least one of the first data or the second data according to the location of the first time resource in the target time unit and the location of the second time resource in the target time unit.

Herein, the terminal executing the method 100 may support communication with TTIs of different lengths. In terms of SPS, the base station sends the first indication signaling to the terminal, the first indication signaling indicating the terminal to perform SPS. During SPS, the terminal performs data communication on the same frequency resource at a fixed interval. Therefore, the terminal performs SPS data communication on some time-frequency resources at fixed locations. In the embodiments of the disclosure, one of these fixed time-frequency resources, in the frequency domain, corresponds to the target carrier, and in the time domain, corresponds to a target subframe. The terminal occupies the first time resource in the target subframe to communicate the first SPS data at the first III on the target subframe of the target carrier. Preferably, the first indication signaling is DCI, and the first DCI includes information indicative of the target carrier and the target subframe. The terminal determines the specific location of the first time resource occupied by SPS transmission in the target subframe.

In terms of DS, the base station sends the second indication signaling to the terminal, the second indication signaling indicating the terminal to communicate the second DS data at the second TTI on the target subframe of the target carrier. Correspondingly, the terminal receives the second indication signaling of the base station. Preferably, the indication signaling is DCI, and the DCI includes information indicative of the target carrier and the target subframe. The terminal determines the location of the second time resource occupied by DS transmission in the target subframe.

Here, the length of the first TTI is unequal to the length of the second TTI, moreover, the length of the first TTI is smaller than or equal to the length of the time unit (the subframe), and the length of the second TTI is smaller than or equal to the length of the time unit (the subframe).

The terminal controls communication of the first data and the second data, or, in other words, determines to communicate at least one of the first data or the second data according to the location of the first time resource occupied by the first SPS data in the target subframe and the location of the second time resource occupied by the second DS data in the target subframe.

Specifically, communication of the first SPS data includes sending of a first SPS scheduling PUSCH, and here, the first SPS PUSCH is called as an SPS-PUSCH for short. Communication of the second DS data includes sending of a second DS PUSCH, and here, the second DS PUSCH is called as a dyn-PUSCH.

Or, in another condition, communication of the first SPS data includes reception of a first SPS PDSCH, and here, the first SPS PDSCH is called as an SPS-PDSCH for short. Communication of the second DS data includes reception of a second DS PDSCH, and here, the second DS PDSCH is called as a dyn-PDSCH for short.

According to the data communication method of the embodiment of the disclosure, the terminal supports communication with different TTIs, the base station indicates the terminal to communicate the first SPS data at the first TTI and communicate the second DS data at the second TTI on the target time unit of the target carrier, and at least one of the first data or the second data is determined to be communicated according to the respective locations of the first time resource occupied for SPS transmission and the second time resource occupied for DS transmission in the target time unit, so that DS and SPS at different TTIs are implemented.

In various embodiments of the disclosure, the target subframe may include time resources occupied to transmit PDCCHs and time resources occupied to transmit data, and both the first time resource and the second time resource belong to time resources occupied to transmit data.

In an embodiment of the disclosure, the length of the first TTI is 1 ms, and the length of the second TTI is smaller than 1 ms. The operation that the terminal determines to communicate at least one of the first data or the second data according to the location of the first time resource in the target time unit and the location of the second time resource in the target time unit in S140 may include that: when the first time resource and the second time resource are overlapped in the target time unit, the terminal determines only to occupy the first time resource to communicate the first data. A schematic diagram of data communication according to the embodiment is illustrated in FIG. 2.

In the embodiment, as illustrated in FIG. 2, in the target subframe of the target carrier, the length of the first TTI is 1 ms (that is, an existing TTI is adopted for communication of the SPS-PUSCH/SPS-PDSCH), and the SPS-PUSCH/SPS-PDSCH is specifically communicated on the first time resource. The base station dynamically schedules the terminal to occupy the second time resource to communicate the dyn-PUSCH/dyn-PDSCH at the second TTI (the length of the second TTI is smaller than 1 ms) in the target subframe of the target carrier. The terminal determines the locations of the first time resource and the second time resource. When the first time resource and the second time resource are overlapped in the target subframe, the terminal only occupies the first time resource to communicate the SPS-PUSCH/SPS-PDSCH, and does not communicate the dyn-PUSCH/dyn-PDSCH.

In another embodiment of the disclosure, the length of the first TTI is 1 ms, and the length of the second TTI is smaller than 1 ms. The operation that the terminal determines to communicate at least one of the first data or the second data according to the location of the first time resource in the target time unit and the location of the second time resource in the target time unit in S140 may include that: when the first time resource and the second time resource are overlapped in the target time unit and a starting time location of the first time resource is the same as a starting time location of the second time resource, the terminal determines only to occupy the second time resource to communicate the second data.

It is to be understood that, when the length of the first TTI is 1 ms and the length of the second TTI is smaller than 1 ms, the starting time location of the second time resource may only be the same as the starting time location of the first time resource or after the starting time location of the first time resource. The condition that the starting time location of the first time resource is the same as the starting time location of the second time resource is discussed in this embodiment. A schematic diagram of data communication according to the embodiment is illustrated in FIG. 3.

Figure 3:
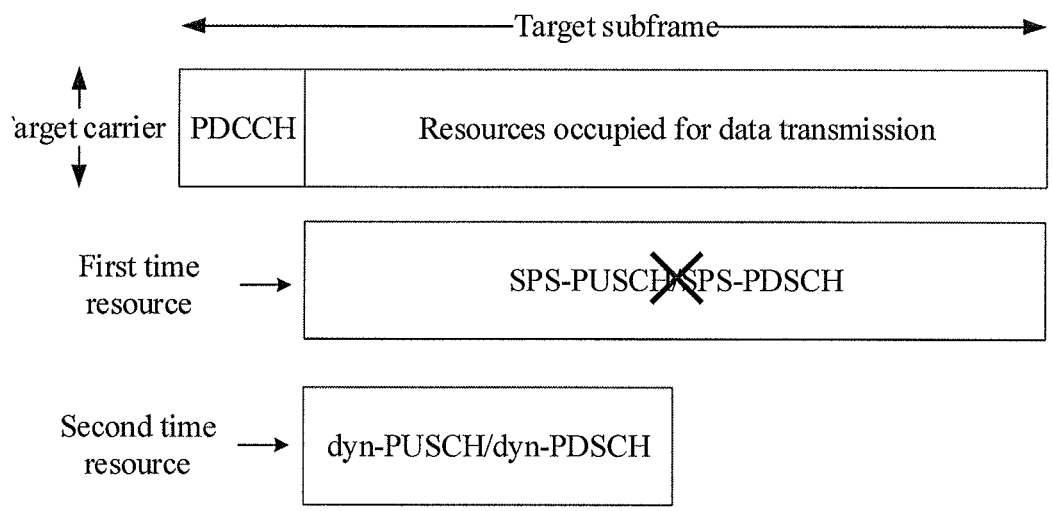
FIG. 3 illustrates a schematic diagram of data communication according to another embodiment of the disclosure.

In the embodiment, as illustrated in FIG. 3, in the target subframe of the target carrier, the length of the first TTI is 1 ms (that is, the existing TTI is adopted for communication of the SPS-PUSCH/SPS-PDSCH), and the SPS-PUSCH/SPS-PDSCH is specifically communicated on the first time resource. The base station dynamically schedules the terminal to occupy the second time resource to communicate the dyn-PUSCH/dyn-PDSCH at the second FIT (the length of the second TTI is smaller than 1 ms) in the target subframe of the target carrier. The terminal determines the locations of the first time resource and the second time resource. When the starting time location of the second time resource is the same as the starting time location of the time resource occupied for data communication and the first time resource and the second time resource are overlapped in the target subframe, the terminal only occupies the second time resource to communicate the dyn-PUSCH/dyn-PDSCH, and does not communicate the SPS-PUSCH/SPS-PDSCH.

In the embodiment, the length of the first TTI is 1 ms, and the length of the second TTI is smaller than 1 ms. The operation that the terminal determines to communicate at least one of the first data or the second data according to the location of the first time resource in the target time unit and the location of the second time resource in the target time unit in S140 may include that: when the first time resource and the second time resource are overlapped in the target time unit and the starting time location of the second time resource is after the starting time location of the first time resource, the terminal determines only to occupy the first time resource to communicate the first data. A schematic diagram of data communication according to the embodiment is illustrated in FIG. 4.

Figure 4:
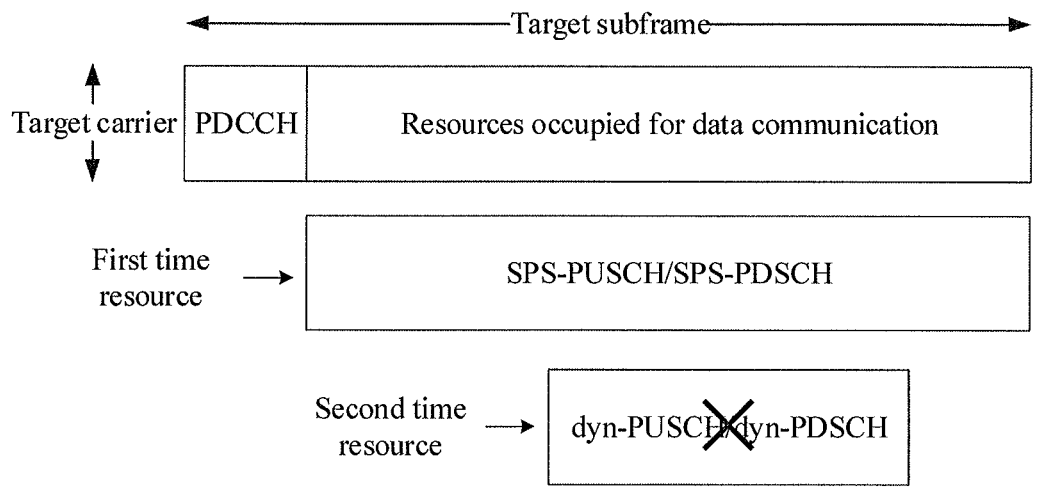
FIG. 4 illustrates a schematic diagram of data communication according to another embodiment of the disclosure.

In the embodiment, as illustrated in FIG. 4, in the target subframe of the target carrier, the length of the first TTI is 1 ms (that is, the existing TTI is adopted for communication of the SPS-PUSCH/SPS-PDSCH), and the SPS-PUSCH/SPS-PDSCH is specifically communicated on the first time resource. The base station dynamically schedules the terminal to occupy the second time resource to communicate the dyn-PUSCH/dyn-PDSCH at the second TTI (the length of the second TTI is smaller than 1 ms) in the target subframe of the target carrier. The terminal determines the locations of the first time resource and the second time resource. When the starting time location of the second time resource is after the starting time location of the time resource occupied for data communication and the first time resource and the second time resource are overlapped in the target subframe, the terminal only occupies the first time resource to communicate the SPS-PUSCH/SPS-PDSCH, and does not communicate the dyn-PUSCH/dyn-PDSCH.

It is to be understood that the schemes corresponding to FIG. 3 and FIG. 4 respectively may be combined into a scheme.

In another embodiment of the disclosure, the length of the first TTI is smaller than 1 ms, and the length of the second TTI is smaller than 1 ms. The operation that the terminal determines to communicate at least one of the first data or the second data according to the location of the first time resource in the target time unit and the location of the second time resource in the target time unit in S140 may include that: when the first time resource and the second time resource are not overlapped in the target time unit, the terminal determines to occupy the first time resource to communicate the first data and occupy the second time resource to communicate the second data. A schematic diagram of data communication according to the embodiment is illustrated in FIG. 5.

Figure 5:
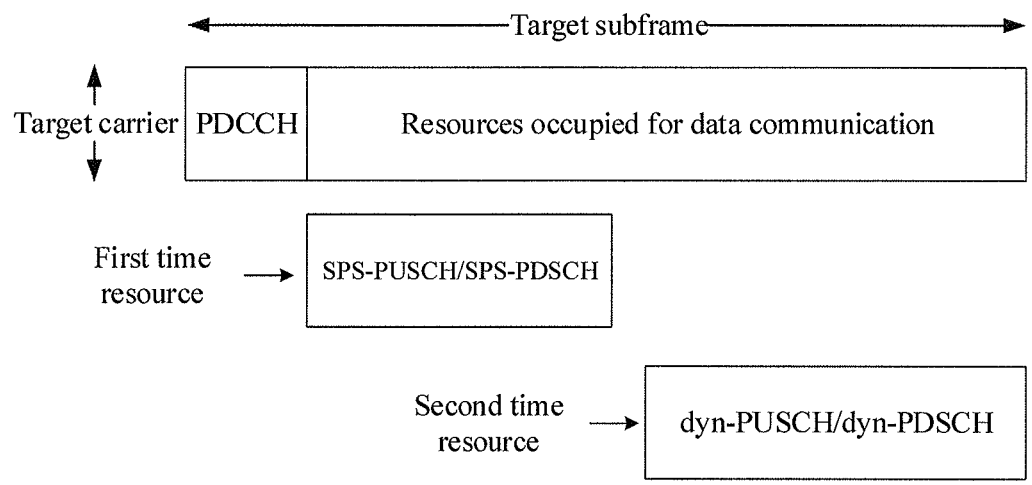
FIG. 5 illustrates a schematic diagram of data communication according to another embodiment of the disclosure.

In the embodiment, as illustrated in FIG. 5, on the target subframe of the target carrier, the length of the first TTI is 1 ms, and the SPS-PUSCH/SPS-PDSCH is specifically communicated on the first time resource. The base station dynamically schedules the terminal to occupy the second time resource to communicate the dyn-PUSCH/dyn-PDSCH at the second TTI (the length of the second TTI is smaller than 1 ms) on the target subframe of the target carrier. The terminal determines the locations of the first time resource and the second time resource. When the first time resource and the second time resource are not overlapped in the target subframe, the terminal occupies the first time resource to communicate the SPS-PUSCH/SPS-PDSCH, and the terminal occupies the second time resource to communicate the dyn-PUSCH/dyn-PDSCH.

In another embodiment of the disclosure, the length of the first TTI is smaller than 1 ms, and the length of the second TTI is smaller than 1 ms. The operation that the terminal determines to communicate at least one of the first data or the second data according to the location of the first time resource in the target time unit and the location of the second time resource in the target time unit in S140 may include that: when the first time resource and the second time resource are overlapped in the target time unit, the terminal determines only to occupy the first time resource to communicate the first data. A schematic diagram of data communication according to the embodiment is illustrated in FIG. 6.

Figure 6:
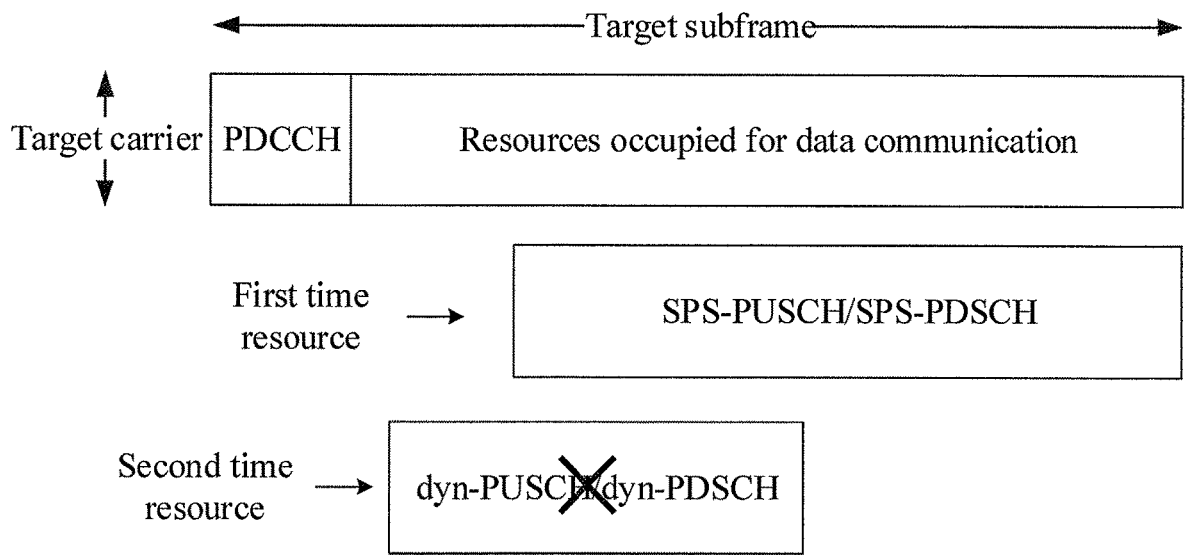
FIG. 6 illustrates a schematic diagram of data communication according to another embodiment of the disclosure.

In the embodiment, as illustrated in FIG. 6, in the target subframe of the target carrier, the length of the first TTI is smaller than 1 ms, and the SPS-PUSCH/SPS-PDSCH is specifically communicated on the first time resource. The base station dynamically schedules the terminal to occupy the second time resource to communicate the dyn-PUSCH/dyn-PDSCH at the second TTI (the length of the second TTI is smaller than 1 ms) in the target subframe of the target carrier. The terminal determines the locations of the first time resource and the second time resource. When the first time resource and the second time resource are overlapped in the target subframe, the terminal only occupies the first time resource to communicate the SPS-PUSCH/SPS-PDSCH, and does not communicate the dyn-PUSCH/dyn-PDSCH.

It is to be understood that the schemes corresponding to FIG. 5 and FIG. 6 respectively may be combined into a scheme.

In another embodiment of the disclosure, the length of the first TTI is smaller than 1 ms, and the length of the second TTI is smaller than 1 ms. The operation that the terminal determines to communicate at least one of the first data or the second data according to the location of the first time resource in the target time unit and the location of the second time resource in the target time unit in S140 may include that: when the first time resource and the second time resource are overlapped in the target time unit and the starting time location of the first time resource is after the starting time location of the second time resource, the terminal determines only to occupy the second time resource to communicate the second data. A schematic diagram of data communication according to the embodiment is illustrated in FIG. 7.

Figure 7:
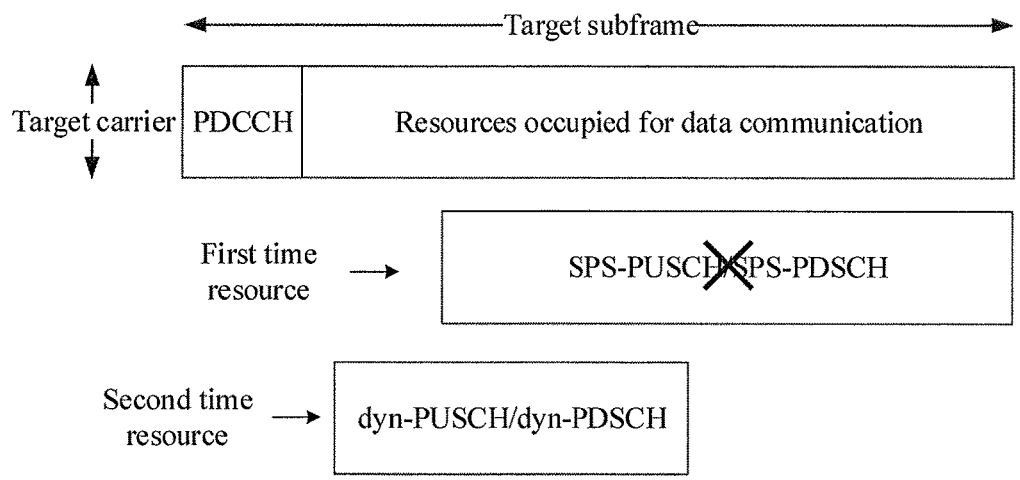
FIG. 7 illustrates a schematic diagram of data communication according to another embodiment of the disclosure.

In the embodiment, as illustrated in FIG. 7, in the target subframe of the target carrier, the length of the first TTI is smaller than 1 ms, and the SPS-PUSCH/SPS-PDSCH is specifically communicated on the first time resource. The base station dynamically schedules the terminal to occupy the second time resource to communicate the dyn-PUSCH/dyn-PDSCH at the second TTI (the length of the second TTI is smaller than 1 ms) in the target subframe of the target carrier. The terminal determines the locations of the first time resource and the second time resource. When the first time resource and the second time resource are overlapped in the target subframe and the starting time location of the first time resource is after the starting time location of the second time resource, the terminal only occupies the second time resource to communicate the dyn-PUSCH/dyn-PDSCH, and does not communicate the SPS-PUSCH/SPS-PDSCH.

In another embodiment of the disclosure, the length of the first TTI is smaller than 1 ms, and the length of the second TTI is smaller than 1 ms. The operation that the terminal determines to communicate at least one of the first data or the second data according to the location of the first time resource in the target time unit and the location of the second time resource in the target time unit in S140 may include that: when the first time resource and the second time resource are overlapped in the target time unit and the starting time location of the second time resource is after the starting time location of the first time resource, the terminal determines only to occupy the first time resource to communicate the first data. A schematic diagram of data communication according to the embodiment is illustrated in FIG. 8.

Figure 8:
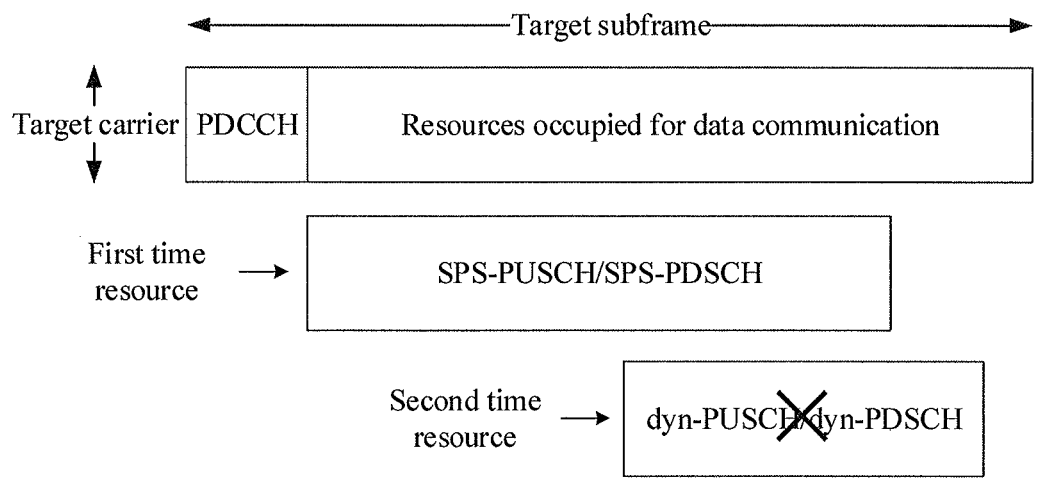
FIG. 8 illustrates a schematic diagram of data communication according to another embodiment of the disclosure.

In the embodiment, as illustrated in FIG. 8, in the target subframe of the target carrier, the length of the first TTI is smaller than 1 ms, and the SPS-PUSCH/SPS-PDSCH is specifically communicated on the first time resource. The base station dynamically schedules the terminal to occupy the second time resource to communicate the dyn-PUSCH/dyn-PDSCH at the second TTI (the length of the second TTI is smaller than 1 ms) in the target subframe of the target carrier. The terminal determines the locations of the first time resource and the second time resource. When the first time resource and the second time resource are overlapped in the target subframe and the starting time location of the second time resource is after the starting time location of the first time resource, the terminal only occupies the first time resource to communicate the SPS-PUSCH/SPS-PDSCH, and does not communicate the dyn-PUSCH/dyn-PDSCH.

It is to be understood that the schemes corresponding to FIG. 7 and FIG. 8 respectively may be combined into a scheme.

It is also to be understood that the schemes corresponding to FIG. 5, FIG. 7 and FIG. 8 respectively may be combined into a scheme.

Figure 9:
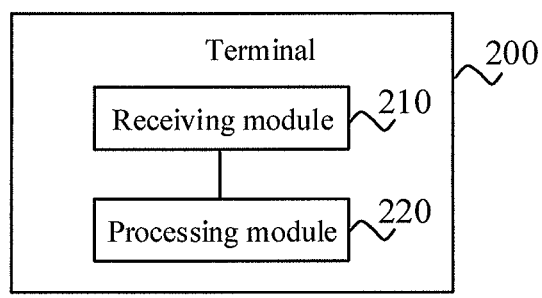
FIG. 9 illustrates a schematic block diagram of a terminal according to an embodiment of the disclosure.

FIG. 9 illustrates a schematic block diagram of a terminal 200 according to an embodiment of the disclosure. The terminal 200 includes a receiving module 210 and a processing module 220.

The receiving module 210 may be configured to receive first indication signaling sent by a base station, the first indication signaling indicating the terminal to communicate first SPS data at a first TTI on a target time unit of a target carrier.

The receiving module 210 may be further configured to receive second indication signaling sent by the base station, the second indication signaling indicating the terminal to communicate second DS data at a second TTI on the target time unit of the target carrier, where a length of the first TTI is unequal to a length of the second TTI, the length of the first TTI is smaller than or equal to a length of the time unit, and the length of the second TTI is smaller than or equal to the length of the time unit.

The processing module 220 may be configured to determine a location of a first time resource occupied by SPS transmission in the target time unit and a location of a second time resource occupied by DS transmission in the target time unit.

The processing module 220 may further be configured to determine to communicate at least one of the first data or the second data according to the location of the first time resource in the target time unit and the location of the second time resource in the target time unit.

In the embodiment of the disclosure, the terminal supports communication at different TTIs, the base station indicates the terminal to communicate the first SPS data at the first TTI and communicate the second DS data at the second TTI on the target time unit of the target carrier, and at least one of the first data or the second data is determined to be communicated according to the respective locations of the first time resource occupied for SPS transmission and the second time resource occupied for DS transmission in the target time unit, so that DS and SPS at respective different TTIs are implemented.

Alternatively, in an embodiment, communication of the first SPS data includes sending of a first SPS scheduling PUSCH, and communication of the second DS data includes sending of a second DS PUSCH; or communication of the first SPS data includes reception of a first SPS PDSCH, and communication of the second DS data includes reception of a second DS PDSCH.

In the embodiment of the disclosure, the time unit may be a subframe.

Alternatively, in an embodiment, the processing module 220 may specifically be configured to, when the first time resource and the second time resource are overlapped in the target time unit, determine, by the terminal, only to occupy the first time resource to communicate the first data.

Alternatively, in an embodiment, the processing module 220 may specifically be configured to, when the first time resource and the second time resource are overlapped in the target time unit and a starting time location of the first time resource is the same as a starting time location of the second time resource or the starting time location of the first time resource is after the starting time location of the second time resource, determine, by the terminal, only to occupy the second time resource to communicate the second data.

Alternatively, in an embodiment, the processing module 220 may specifically be configured to, when the first time resource and the second time resource are overlapped in the target time unit and the starting time location of the second time resource is after the starting time location of the first time resource, determine, by the terminal, only to occupy the first time resource to communicate the first data.

Alternatively, in an embodiment, the processing module 220 may specifically be configured to, when the first time resource and the second time resource are not overlapped in the target time unit, determine, by the terminal, to occupy the first time resource to communicate the first data and occupy the second time resource to communicate the second data.

Figure 10:
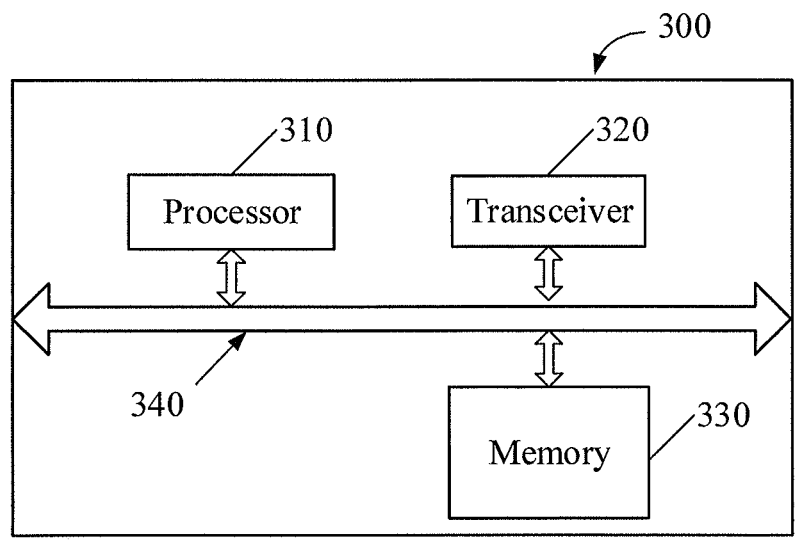
FIG. 10 illustrates a schematic block diagram of a terminal according to another embodiment of the disclosure.

It is to be noted that, in the embodiment of the disclosure, the receiving module 210 may be implemented by a transceiver, and the processing module 220 may be implemented by a processor. As illustrated in FIG. 10, a terminal 300 may include a processor 310, a transceiver 320 and a memory 330, wherein the memory 330 may be configured to store a code executed by the processor 310 and the like.

The components in the terminal 300 are coupled together through a bus system 340, where the bus system 340 includes a data bus, and further includes a power bus, a control bus and a state signal bus.

The terminal 200 illustrated in FIG. 9 and the terminal 300 illustrated in FIG. 10 may implement each process implemented in the embodiments in FIG. 1 to FIG. 8, which will not be elaborated herein to avoid repetition.

It is to be noted that the method embodiments of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment for convenient and brief description and will not be elaborated herein.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A data communication method, comprising:
  receiving, by a terminal, first indication signaling sent by
    a base station, the first indication signaling indicating the terminal to communicate first semi-persistent scheduling (SPS) data at a first Transmission Time Interval (TTI) on a target time unit of a target carrier;

receiving, by the terminal, second indication signaling sent by the base station, the second indication signaling indicating the terminal to communicate second dynamic scheduling (DS) data at a second TTI on the target time unit of the target carrier, wherein a length of the first TTI is unequal to a length of the second TTI, moreover, the length of the first TTI is smaller than or equal to a length of a time unit, and the length of the second TTI is smaller than or equal to the length of the time unit;

determining, by the terminal, a location of a first time resource occupied by SPS transmission in the target time unit and a location of a second time resource occupied by DS transmission in the target time unit; and determining, by the terminal, to communicate at least one of the first SPS data or the second DS data according to the location of the first time resource in the target time unit and the location of the second time resource in the target time unit.

2. The method according to claim 1, wherein communication of the first SPS data comprises sending of a first SPS Physical Uplink Shared Channel (PUSCH), and communication of the second DS data comprises sending of a second DS PUSCH; or communication of the first SPS data comprises reception of a first SPS Physical Downlink Shared Channel (PDSCH), and communication of the second DS data comprises reception of a second DS PDSCH.

3. The method according to claim 1, wherein determining, by the terminal, to communicate at least one of the first SPS data or the second DS data according to the location of the first time resource in the target time unit and the location of the second time resource in the target time unit comprises:

when the first time resource and the second time resource are overlapped in the target time unit, determining, by the terminal, to occupy the first time resource to communicate the first SPS data.

4. The method according to claim 1, wherein determining, by the terminal, to communicate at least one of the first SPS data or the second DS data according to the location of the first time resource in the target time unit and the location of the second time resource in the target time unit comprises:

when the first time resource and the second time resource are overlapped in the target time unit and a starting time location of the first time resource is the same as a starting time location of the second time resource or the starting time location of the first time resource is after the starting time location of the second time resource, determining, by the terminal, to occupy the second time resource to communicate the second DS data.

5. The method according to claim 1, wherein determining, by the terminal, to communicate at least one of the first SPS data or the second DS data according to the location of the first time resource in the target time unit and the location of the second time resource in the target time unit comprises:

when the first time resource and the second time resource are overlapped in the target time unit and the starting time location of the second time resource is after the starting time location of the first time resource, determining, by the terminal, to occupy the first time resource to communicate the first SPS data.

6. The method according to claim 1, wherein determining, by the terminal, to communicate at least one of the first SPS data or the second DS data according to the location of the first time resource in the target time unit and the location of the second time resource in the target time unit comprises:

when the first time resource and the second time resource are not overlapped in the target time unit, determining, by the terminal, to occupy the first time resource to communicate the first SPS data and occupy the second time resource to communicate the second DS data.

7. The method according to claim 1, wherein the time unit is a subframe.

8. A terminal, comprising:

a transceiver, configured to receive first indication signaling sent by a base station, the first indication signaling indicating the terminal to communicate first Semi-Persistent Scheduling (SPS) data at a first Transmission Time Interval (TTI) on a target time unit of a target carrier, and further configured to receive second indication signaling sent by the base station, the second indication signaling indicating the terminal to communicate second DS data at a second TTI on the target time unit of the target carrier, wherein a length of the first TTI is unequal to a length of the second TTI, moreover, the length of the first TTI is smaller than or equal to a length of a time unit, and the length of the second TTI is smaller than or equal to the length of the time unit; and a processor, configured to determine a location of a first time resource occupied by SPS transmission in the target time unit and a location of a second time resource occupied by DS transmission in the target time unit, and further configured to determine to communicate at least one of the first SPS data or the second DS data according to the location of the first time resource in the target time unit and the location of the second time resource in the target time unit.

9. The terminal according to claim 8, wherein communication of the first SPS data comprises sending of a first SPS scheduling Physical Uplink Shared Channel (PUSCH), and communication of the second DS data comprises sending of a second DS PUSCH; or communication of the first SPS data comprises reception of a first SPS Physical Downlink Shared Channel (PDSCH), and communication of the second DS data comprises reception of a second DS PDSCH.

10. The terminal according to claim 8, wherein the processor is configured to:

when the first time resource and the second time resource are overlapped in the target time unit, determine to occupy the first time resource to communicate the first SPS data.

11. The terminal according to claim 8, wherein the processor is configured to:

when the first time resource and the second time resource are overlapped in the target time unit and a starting time location of the first time resource is as same as a starting time location of the second time resource or the starting time location of the first time resource is after the starting time location of the second time resource, determine to occupy the second time resource to communicate the second DS data.

12. The terminal according to claim 8, wherein the processor is configured to:

when the first time resource and the second time resource are overlapped in the target time unit and the starting time location of the second time resource is after the starting time location of the first time resource, determine to occupy the first time resource to communicate the first SPS data.

13. The terminal according to claim 8, wherein the processor is configured to:
when the first time resource and the second time resource are not overlapped in the target time unit, determine to occupy the first time resource to communicate the first SPS data and occupy the second time resource to communicate the second DS data.

14. The terminal according to claim 8, wherein the time unit is a subframe.

15. A non-transitory computer readable medium, storing instructions, when executed by a processor, cause the processor to perform a data communication method, the method comprising:
receiving first indication signaling sent by a base station, the first indication signaling indicating a terminal to communicate first semi-persistent scheduling (SPS) data at a first Transmission Time Interval (TTI) on a target time unit of a target carrier;
receiving second indication signaling sent by the base station, the second indication signaling indicating the terminal to communicate second dynamic scheduling (DS) data at a second TTI on the target time unit of the target carrier, wherein a length of the first TTI is unequal to a length of the second TTI, moreover, the length of the first TTI is smaller than or equal to a length of a time unit, and the length of the second TTI is smaller than or equal to the length of the time unit;
determining a location of a first time resource occupied by SPS transmission in the target time unit and a location of a second time resource occupied by DS transmission in the target time unit; and
determining to communicate at least one of the first SPS data or the second DS data according to the location of the first time resource in the target time unit and the location of the second time resource in the target time unit.

16. The non-transitory computer readable medium according to claim 15, wherein communication of the first SPS data comprises sending of a first SPS Physical Uplink Shared Channel (PUSCH), and communication of the second DS data comprises sending of a second DS PUSCH; or
communication of the first SPS data comprises reception of a first SPS Physical Downlink Shared Channel (PDSCH), and communication of the second DS data comprises reception of a second DS PDSCH.

17. The non-transitory computer readable medium according to claim 15, wherein determining to communicate at least one of the first SPS data or the second DS data according to the location of the first time resource in the target time unit and the location of the second time resource in the target time unit comprises:
when the first time resource and the second time resource are overlapped in the target time unit, determining to occupy the first time resource to communicate the first SPS data.

18. The non-transitory computer readable medium according to claim 15, wherein determining to communicate at least one of the first SPS data or the second DS data according to the location of the first time resource in the target time unit and the location of the second time resource in the target time unit comprises:
when the first time resource and the second time resource are overlapped in the target time unit and a starting time location of the first time resource is the same as a starting time location of the second time resource or the starting time location of the first time resource is after the starting time location of the second time resource, determining to occupy the second time resource to communicate the second DS data.

19. The non-transitory computer readable medium according to claim 15, wherein determining to communicate at least one of the first SPS data or the second DS data according to the location of the first time resource in the target time unit and the location of the second time resource in the target time unit comprises:
when the first time resource and the second time resource are overlapped in the target time unit and the starting time location of the second time resource is after the starting time location of the first time resource, determining to occupy the first time resource to communicate the first SPS data.

20. The non-transitory computer readable medium according to claim 15, wherein determining to communicate at least one of the first SPS data or the second S data according to the location of the first time resource in the target time unit and the location of the second time resource in the target time unit comprises:
when the first time resource and the second time resource are not overlapped in the target time unit, determining to occupy the first time resource to communicate the first SPS data and occupy the second time resource to communicate the second DS data.

* * * * *